2,979,483

MANUFACTURE OF HIGH LINEAR POLYESTERS WITH TIN PHOSPHIDE CATALYST

Ernest Jan Kowolik and James Lincoln, both of Putteridge Bury, near Luton, England, assignors to British Celanese Limited, a corporation of Great Britain No Drawing. Filed Feb. 26, 1957, Ser. No. 642,349

Claims priority, application Great Britain Mar. 7, 1956

12 Claims. (Cl. 260—47)

This invention relates to the manufacture of high linear polyesters, i.e. linear polyester of intrinsic viscosity at least 0.5.

One method of making high linear polyesters consists in causing a dicarboxylic acid or an ester-forming derivative of a dicarboxylic acid to react with a gylcol under conditions favouring polymerisation. For example a dialkyl ester or other diester of a dicarboxylic acid may be caused to react with a gylcol under conditions such that an ester-interchange reaction first takes place, and is followed by polycondensation of the product; thus dimethyl terephthalate may be caused to react with ethylene glycol to give bis-(beta-hydroxyethyl) terephthalate which is polycondensed to give polyethylene terephthalate.

In U.S. application S. No. 302,822, filed August 5, 1952, there is described a better process, in which the dicarboxylic acid is caused to react with the cyclic carbonate of a glycol; thus polyethylene terephthalate is made by the reaction of terephthalic acid with ethylene glycol carbonate. An improvement of this process described in U.S. application S. No. 494,574, filed March 15, 1955, consists in first forming a low polyester of intrinsic viscosity 0.1–0.4, and then bringing further dicarboxylic acid and glycol carbonate into contact with it under polymerising conditions; this process can with advantage be operated on a semi-continuous basis by working in stages, in the first of which low polyester of intrinsic viscosity 0.1–0.4 is produced as a continuous operation by the reaction of the dicarboxylic acid and glycol carbonate in the presence of already formed low polyester, the later stage or stages comprising the batchwise further polycondensation of the low polyester so obtained to a fibre-forming product. While these various processes differ in important respects, they are related in that in all of them the high linear polyester is made by polycondensation either of a bis-hydroxy-ester, usually a bis-($\omega$-hydroxy-n-alkyl) ester, of a dicarboxylic acid or of a low polyester of intrinsic viscosity 0.1–0.4 obtainable from such an ester.

In all these methods it is in practice advisable to employ a catalyst if the reaction is to be carried through in a reasonable time. Many different catalysts have been used, among them sodium, potassium, and lithium metals, magnesium ribbon, alkali metal salts of the reacting dicarboxylic acid, and various metal alcoholates. In the ester-interchange process it has also been proposed to employ two catalysts, one for the ester-interchange and one for the polycondensation.

It has now been found that phosphides of tin, especially stannous phosphide, are very good catalysts for the polycondensation processes referred to above, and that when stannous phosphide in particular is used, the polyester formed generally has a higher intrinsic viscosity than can be obtained by the use of the generality of known catalysts under the same conditions.

According to the invention therefore, in the manufacture of high linear polyesters by a method which includes the polycondensation of a bis-hydroxy-ester, especially a bis-hydroxy-alkyl ester and in particular a bis-($\omega$-hydroxy-n-alkyl) ester, of a dicarboxylic acid, or of a low polyester obtainable by polycondensation from such an ester, a tin phosphide is used as catalyst for the polycondensation of the said ester or low polyester.

In describing the invention in more detail it will be convenient to refer specifically to stannous phosphide (SnP), as being the preferred catalyst. It will however be understood that other tin phosphides, for example tin triphosphide ($SnP_3$) and tetra-tin triphosphide ($Sn_4P_3$) can also be employed.

Whatever the precise method used to convert the initial monomeric starting materials into the desired high linear polyester, the stannous phosphide may be present throughout the whole process, i.e. it may be present in the initial mixture of monomeric substances or of monomeric substances and low polymer, or it may be added only at a later stage in the process, in which case some other catalyst is preferably employed from the beginning. Thus when the ester-interchange method is used the first stage may be carried out with the aid of a known ester-interchange catalyst, after which stannous phosphide is added so as to catalyse the polycondensation. Similarly when the process of U.S. application S. No. 494,574 is operated in the semi-continuous manner described above, the stannous phosphide need not be added until after the first stage (in which low polymer is continuously produced) so that it is present only during the further polycondensation to the high polymer level. The first stage is then preferably carried out in the presence of a known catalyst, for example an alkali metal beryllate, or one of the catalysts specified in U.S. application S. No. 494,574.

The polycondensation of the bis-hydroxy-ester or the low polyester may be effected in a known way (apart of course from the particular catalyst employed), as by heating it at first to a temperature between about 200° and 300° C., and later to a temperature between about 250° and 300° C., the pressure in the later stages preferably being reduced below 5 mm. of mercury. The stannous phosphide is preferably used in a finely divided form and is intimately dispersed throughout the composition. The amount of stannous phosphide used may vary over a considerable range; useful proportions are 0.025–1.5%, and especially 0.035–1.0%, of the weight of polyester to be produced, assuming a yield of 100% based on the amount of the ester or low polyester employed. Generally speaking, proportions of stannous phosphide towards the lower end of the range give polymers of the best colour, though the intrinsic viscosity is at its highest when higher proportions are used.

The invention is illustrated by the following examples; the "parts" given are by weight.

Example 1

500 parts of dimethyl terephthalate, 400 parts of ethylene glycol and 2 parts of finely powdered stannous phosphide were heated together in an atmosphere of nitrogen under atmosheric pressure for 2 hours at 180°–200° C. and the resulting bis-($\beta$-hydroxyethyl) terephthalate heated for a further 2 hours at 220° C. The pressure was then reduced to 4–5 mm. and the temperature raised to 270° C. for a further 3 hours. The resulting polyethylene terephthalate had an intrinsic viscosity of 0.59 and a melting point of 250°–254° C., and could be formed into fibres capable of being cold drawn.

When the stannous phosphide was replaced by an equal weight of sodium methoxide, all the other conditions being the same, the polymer produced had an intrinsic viscosity of only 0.41, though it still melted at 250°–254° C.

The term "intrinsic viscosity" is employed herein to denote the natural logarithm of the relative viscosity of a solution of 1 gram of the polymer in 100 cc. of a mixture of 3 parts of phenol with 2 parts of tetrachloroethane at 20° C.

Example II

A low polyester of intrinsic viscosity about 0.2 was made by heating 500 parts of terephthalic acid, 292 parts of ethylene carbonate, 0.5 part of sodium terephthalate and 1.2 parts of titanium dioxide pigment to 270° C. for 3 hours in an atmosphere of nitrogen. The low polyester was then powdered and mixed with 0.8 part of finely divided stannous phosphide, and the mixture was heated under a high vacuum to 270° C. for 3 hours. The resulting polyethylene terephthalate had an intrinsic viscosity of 1.04 in one run and 0.96 in another. In yet another run, when 0.4 part of stannous phosphide was used, the polymer had an intrinsic viscosity of 0.83, and in another, using 0.2 part of stannous phosphide, the intrinsic viscosity was 0.53 and the colour was particularly good. When no catalyst was used the intrinsic viscosity was 0.25.

It may be noted here that the peculiar properties of the tin phosphides, especially stannous phosphide, are not shared generally by phosphides of other metals. For instance when the process described in this example was carried out using 1 part of zinc phosphide as catalyst instead of the stannous phosphide, the polymer produced had an intrinsic viscosity of 0.43 and its colour was only fair.

While the invention has so far been described with particular reference to the production of polyethylene terephthalate, it is applicable also to the manufacture of high linear polyesters (including polyether esters as described in U.S. application S. No. 374,825, filed August 7, 1952) derived from other dicarboxylic acids and/or other glycols. Examples of such other dicarboxylic acids include adipic acid, suberic acid, sebacic acid, certain substituted terephthalic acids, diphenyl-4,4′-dicarboxylic acid, α,β-diphenylethane-4,4′-dicarboxylic acid, α,δ-diphenylbutane-4,4′-dicarboxylic acid and other α,ω-diphenylalkane-4,4′-dicarboxylic acids, α,β-diphenoxyethane-4,4′-dicarboxylic acid, α,δ-diphenoxybutane-4,4′-dicarboxylic acid and other α,ω-diphenoxyalkane-4,4′-dicarboxylic acids, and the 1.5-, 2.6- and 2.7-naphthalene-dicarboxylic acids. All these aromatic dicarboxylic acids have their carboxyl groups linked to the aromatic nucleus or nuclei in such a way that (taking the shortest path through the carbon atoms of the nucleus) there are at least four nuclear carbon atoms in each nucleus between the linkages. In this definition a single benzene ring or a single naphthalene ring counts as one aromatic nucleus, while diphenyl ($C_6H_5 \cdot C_6H_5$) and diphenyl alkane ($C_6H_5 \cdot (CH_2)_n \cdot C_6H_5$) count as two aromatic nuclei. The preferred dicarboxylic acids are those whose carboxyl groups are linked to the aromatic nuclei in diametrically opposite positions, that is to say in the para position with a single benzene nucleus, in the 4,4′ position with compounds containing two benzene nuclei, and in the 1.5 or 2.6 positions with compounds of the naphthalene series. The glycol component of the polyester is preferably a polymethylene glycol containing 2–10 methylene groups.

The following examples describe the use of stannous phosphide in the production of a high linear polyester derived from an aliphatic dicarboxylic acid.

Example III

A low polyethylene sebacate of intrinsic viscosity about 0.2 was made by heating 408 parts of sebacic acid, 192 parts of ethylene carbonate and 1 part of sodium beryllate to 260° C. for 4 hours in an atmosphere of nitrogen. One part of finely divided stannous phosphide was then added and the mixture heated to 265°–270° C. under a pressure of 2 mm. for 3 hours. The resulting polyester was a very tough opaque solid of melting point 77°–81° C., and had an intrinsic viscosity of 0.74.

When in this example the stannous phosphide was replaced by 2.7 parts of magnesium ribbon the polymer obtained had a melting point of 74°–79° C. and an intrinsic viscosity of 0.55.

Example IV

The process of Example III was repeated, except that the stannous phosphide was present from the beginning, replacing the sodium beryllate. A similar product was obtained.

Having described our invention, what we desire to secure by Letters Patent is:

1. Process for the manufacture of a high linear polyester, which comprises poly-condensing, by heating to a temperature of 200°–300° C., a substance selected from the group consisting of (a) monomeric ω-hydroxy-$C_2$ to $C_{10}$-n-alkyl esters of straight chain alkylene α,ω-dicarboxylic acids wherein the alkylene radical contains from 4 to 8 carbon atoms, (b) monomeric ω-hydroxy-$C_2$ to $C_{10}$-n-alkyl esters of aromatic dicarboxylic acids selected from the group consisting of terephthalic acid, diphenyl-4:4′-dicarboxylic acid, α,β-diphenylethane-4:4′-dicarboxylic acid, α,δ-diphenylbutane-4:4′-dicarboxylic acid, α,β-diphenoxyethane-4:4′-dicarboxylic acid, α,δ-diphenoxybutane-4:4′-dicarboxylic acid, 1:5-naphthalene-dicarboxylic acid, 2:6-naphthalene-dicarboxylic acid, and 2:7-naphthalene-dicarboxylic acid, and (c) polymeric polyesters of intrinsic viscosity up to 0.4 obtained by heating at about 200 to 300° C. the dicarboxylic esters specified under (a) and (b), the said polycondensation being effected in the presence of a phosphide of tin as catalyst, and continued until the polyester produced has an intrinsic viscosity of at least 0.5.

2. Process according to claim 1, wherein the compound SnP is used as catalyst.

3. Process for the manufacture of a high linear polyethylene terephthalate, which comprises polycondensing, by heating to a temperature of 200°–300° C., bis-(β-hydroxyethyl) terephthalate, the polycondensation being effected in the presence of a phosphide of tin as catalyst, and continued until the polyethylene terephthalate produced has an intrinsic viscosity of at least 0.5.

4. Process according to claim 3, wherein the compound SnP is used as catalyst.

5. Process for the manufacture of a high linear polyethylene terephthalate, which comprises heating a mixture of a dialkyl terephthalate and ethylene glycol containing an ester-interchange catalyst to form bis-(β-hydroxyethyl) terephthalate and continuing the heating at a temperature of 200°–300° C. until first a polyethylene terephthalate of intrinsic viscosity 0.1–0.4, and later a polyethylene terephthalate of intrinsic viscosity at least 0.5 has been formed, and adding a phosphide of tin as catalyst to the reactant mixture before the intrinsic viscosity of the product has reached 0.4.

6. Process for the manufacture of a high linear polyethylene terephthalate, which comprises heating to a temperature of 200°–300° C. a mixture of a dialkyl terephthalate and ethylene glycol containing a phosphide of tin as catalyst, and continuing the heating until the bis-(β-hydroxyethyl) terephthalate initially formed has been converted first into polyethylene terephthalate of intrinsic viscosity 0.1–0.4, and later into polyethylene terephthalate of intrinsic viscosity at least 0.5.

7. Process for the manufacture of a high linear polyethylene terephthalate, which comprises heating a mixture of terephthalic acid and ethylene carbonate containing an ester-interchange catalyst to form bis-(β-hydroxyethyl) terephthalate and continuing the heating at a temperature of 200°–300° C. until first a polyethylene terephthalate of intrinsic viscosity 0.1–0.4, and later a polyethylene terephthalate of intrinsic viscosity at least 0.5 has been formed, and adding a phosphide of tin as catalyst to the reactant mixture before the intrinsic viscosity of the product has reached 0.4.

8. Process for the manufacture of a high linear polyethylene terephthalate, which comprises heating to a temperature of 200°–300° C. a mixture of terephthalic acid and ethylene carbonate containing a phosphide of tin as catalyst, and continuing the heating until the bis-(β-hydroxyethyl) terephthalate initially formed has been converted first into polyethylene terephthalate of intrinsic viscosity 0.1–0.4, and later into polyethylene terephthalate of intrinsic viscosity at least 0.5.

9. Process according to claim 5, wherein the amount of tin phosphide catalyst employed is 0.025–1.5% of the weight of the polyethylene terephthalate equivalent to that of the dialkyl terephthalate starting material.

10. Process according to claim 6, wherein the amount of tin phosphide catalyst employed is 0.025–1.5% of the weight of the polyethylene terephthalate equivalent to that of the dialkyl terephthalate starting material.

11. Process according to claim 7, wherein the amount of tin phosphide catalyst employed is 0.025–1.5% of the weight of the polyethylene terephthalate equivalent to that of the terephthalic acid starting material.

12. Process according to claim 8, wherein the amount of tin phosphide catalyst employed is 0.025–1.5% of the weight of the polyethylene terephthalate equivalent to that of the terephthalic acid starting material.

References Cited in the file of this patent
UNITED STATES PATENTS

| | | |
|---|---|---|
| 2,465,319 | Whinfield | Mar. 22, 1949 |
| 2,720,507 | Caldwell | Oct. 11, 1955 |